United States Patent [19]
Lew

[11] Patent Number: 5,131,280
[45] Date of Patent: Jul. 21, 1992

[54] VIBRATING CONDUIT MASS FLOWMETER

[76] Inventor: Hyok S. Lew, 7890 Oak St., Arvada, Colo. 80005

[21] Appl. No.: 502,507

[22] Filed: Mar. 30, 1990

Related U.S. Application Data

[63] Continuation-in-part of Ser. No. 467,481, Jan. 19, 1990, Pat. No. 5,060,523.

[51] Int. Cl.⁵ .............................................. G01F 1/84
[52] U.S. Cl. ................................................ 73/861.38
[58] Field of Search ........................ 73/861.37, 861.38

[56] References Cited

U.S. PATENT DOCUMENTS 4,811,606  3/1989  Hasegawa et al. ............... 73/861.38
4,934,195  6/1990  Hussain ............................ 73/861.38

Primary Examiner—Herbert Goldstein

[57] ABSTRACT

A mass flowmeter comprises a conduit with two end sections respectively extending from the two secured extremities of the conduit and connected to one another by a curved midsection of the conduit, an electromagnetic vibrator vibrating the two opposite halves of the conduit relative to one another in directions generally parallel to a plane including the curved midsection of the conduit, and a pair of motion sensors respectively measuring flexural vibrations of the two opposite halves of the conduit; wherein mass flow rate of media moving through the conduit is determined from the phase angle difference between two flexural vibrations respectively measured by the two motion sensors.

16 Claims, 3 Drawing Sheets

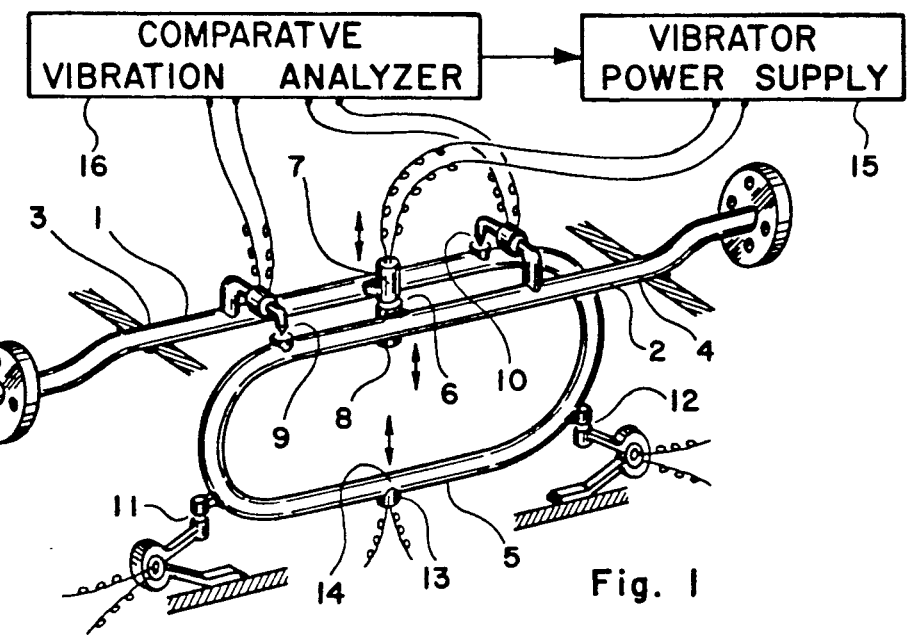
Fig. 1
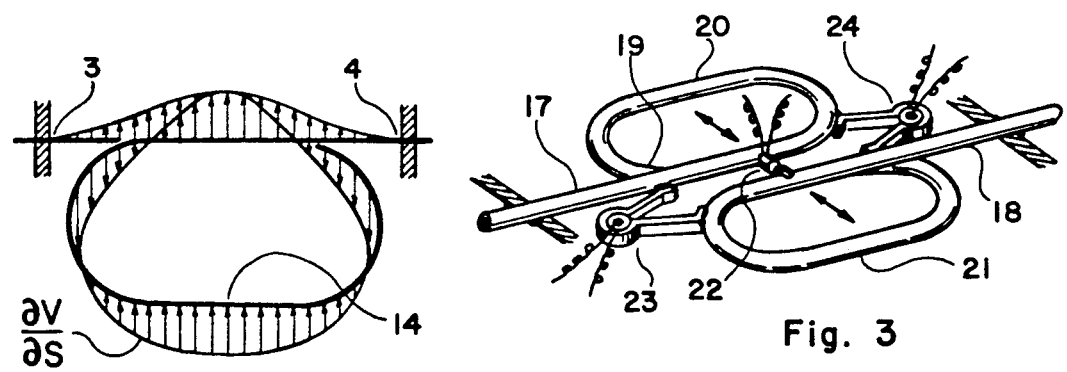
Fig. 2
Fig. 3
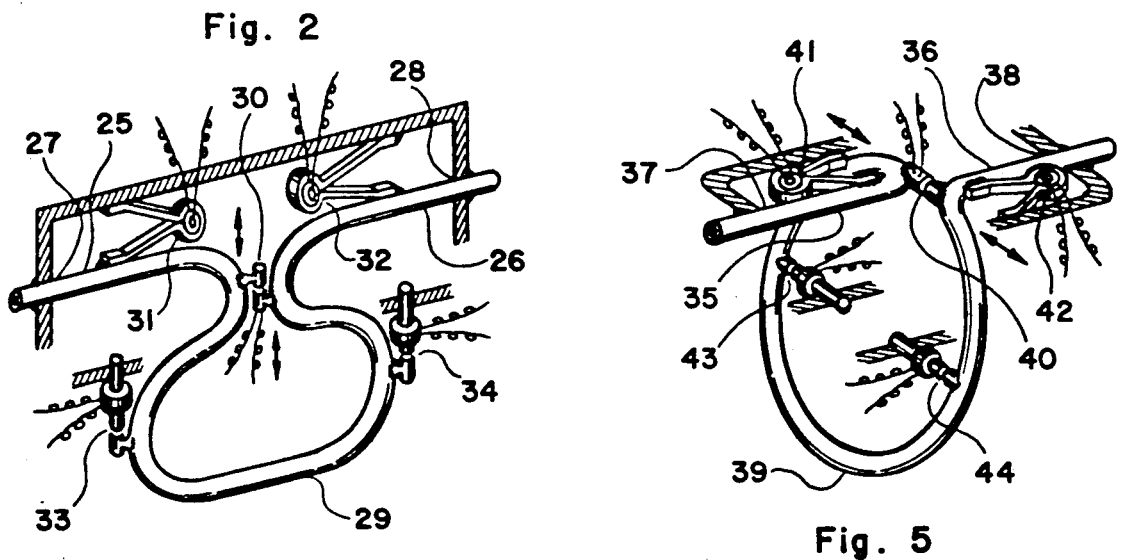
Fig. 4
Fig. 5

VIBRATING CONDUIT MASS FLOWMETER

BACKGROUND OF THE INVENTION

This is a continuation-in-part application to patent application Ser. No. 467,481 entitled "Vibrating Looped Conduit Mass Flowmeter" filed on Jan. 19, 1990, now U.S. Pat. No. 5,060,523.

The present day vibrating conduit mass flowmeters known by the generic name of "Convective Inertia Force" flowmeter or "Coriolis Force" flowmeter employ at least one section of a curved conduit with two fixed ends disposed in a symmetric arrangement about a plane disposed half way between the two fixed ends of the conduit and perpendicular to the plane including the curved conduit, wherein an electromagnetic vibrator disposed at the midsection of the conduit creates a flexural vibration of the conduit in a direction perpendicular to the plane including the curved conduit, which flexural vibration has a mode symmetric about the middle section of the conduit. The media moving through the conduit absorbs the momentum of the flexural vibration from the vibrating conduit in the first half of the conduit where the amplitude of the flexural vibration increases in the direction of the media flow, and releases the momentum of flexural vibration back to the vibrating conduit in the second half of the conduit where the amplitude of the flexural vibration decreases in the direction of the media flow. As a consequence, the media moving through the vibrating conduit under a primary flexural vibration with mode symmetric about the midsection thereof creates a secondary flexural vibration with mode antisymmetric about the midsection, wherein the mass flow rate of the media is proportional to the amplitude of the secondary flexural vibration or to the phase angle difference in the sum of the primary and secondary flexural vibrations between the first and second halves of the conduit. Of course, there are versions of the present day mass flowmeter employing one or more straight conduit under flexural vibration, which design is used in constructing mass flowmeters with a vibrating conduit of diameter equal to or less than one half inch. Without any exception, the existing mass flowmeter employing a straight conduit under flexural vibration has poor sensitivity and is incapable of measuring low values of mass flow rate. The magnitude of reaction of the media moving through a conduit under flexural vibration is proportional to the mass flow rate of the media times the gradient of the flexural vibration of the conduit in the direction of the media flow, which fact immediately suggests that a short conduit must be vibrated with a high amplitude in order to provide a high sensitivity in the measurement of mass flow rates. Creating a high amplitude flexural vibration of a short conduit is not only impractical but also undesirable, as it takes a powerful electromagnetic vibrator to create such a flexural vibration and the conduit under such a flexural vibration usually fails by fatigue of the material making up the conduit. This is precisely the reason why all existing vibrating conduit mass flowmeters, wherein the conduit is vibrated in directions perpendicular to the plane including the curved section of the conduit, suffer from poor sensitivity in the mass flow measurement. The present invention teaches a mass flowmeter employing one or more vibrating conduit that is vibrated laterally in directions parallel to the plane including the curved section of the conduit. The velocity of flexural vibration of the media moving through the curved section of the conduit vanishes at sections whereat the tangential line to the curved conduit is parallel to the directions of the flexural vibration. Therefore, the magnitude of reaction of the media moving through the conduit to the flexural vibration of the conduit can be increased by vibrating a curved conduit in directions parallel to a plane including the curved conduit without increasing the amplitude of the vibration, which fact characterizes the construction of the mass flowmeter of the present invention.

BRIEF SUMMARY OF THE INVENTION

The primary object of the present invention is to provide a mass flowmeter including at least one curved conduit that is vibrated in directions parallel to a plane including the curved conduit, wherein the mass flow rate of media moving through the curved conduit is determined from the difference in the flexural vibration of the curved conduit between the two half sections thereof separated from one another by the midsection of the conduit, which difference in the flexural vibration may be the phase angle difference in the resultant flexural vibration of the conduit between the two half sections or the amplitude of the secondary flexural vibration of the curved conduit.

Another object is to provide a mass flowmeter comprising a conduit with a looped midsection, wherein the two halves of the conduit are vibrated relative to one another on a plane generally including the looped midsection of the conduit in directions generally perpendicular to a line connecting the inlet and outlet sections of the conduit.

A further object is to provide a mass flowmeter comprising a conduit with a curved midsection disposed on a plane generally parallel to a line connecting the inlet and outlet sections of the conduit, wherein the two halves of the conduit is vibrated relative to one another on a plane generally including the curved midsection of the conduit in directions generally perpendicular to the line connecting the inlet and outlet sections of the conduit.

Yet another object is to provide a mass flowmeter comprising a conduit with a curved midsection disposed on a plane generally perpendicular to a line connecting the inlet and outlet sections of the conduit, wherein the two halves of the conduit is vibrated relative to one another in directions generally parallel to the plane including the curved midsection of the conduit.

Yet a further object is to provide a mass flowmeter comprising a conduit with an inlet and outlet sections connected to one another by a curved midsection of the conduit, wherein the two halves of the conduit is vibrated relative to one another in directions generally parallel to a plane including the curved midsection of the conduit and generally parallel to a line connecting the inlet and outlet sections of the conduit.

Still another object is to provide a mass flowmeter comprising at least one conduit with an over-hanging curved midsection, wherein an electromagnetic vibrator vibrates the over-hanging curved midsection of the conduit in directions generally parallel to a plane including the over-hanging midsection of the conduit and generally parallel to a line connecting the inlet and outlet sections of the conduit.

Still a further object is to provide a mass flowmeter comprising at least one conduit with two curved halves disposed on a plane in an axisymmetric arrangement about an axis perpendicular to the plane including the conduit and passing through the midsection of the conduit, wherein the conduit is vibrated on the plane including the conduit in directions generally perpendicular to a line connecting the inlet and outlet sections of the conduit, and the mass flow rate of media moving through the conduit is determined from the difference in the flexural vibration between the two halves of the conduit.

These and other objects of the present invention will become clear as the description thereof progresses.

BRIEF DESCRIPTION OF THE FIGURES

The present invention may be described with a greater clarity and specificity by referring to the following figures:

FIG. 1 illustrates an embodiment of the mass flowmeter of the present invention, that comprises a conduit including a looped midsection, wherein the two halves of the conduit are vibrated relative to one another in directions generally parallel to a plane including the looped midsection of the conduit.

FIG. 2 illustrates the distribution of the reaction force exerted by the media moving through the conduit to the conduit shown in FIG. 1.

FIG. 3 illustrates an embodiment of the mass flowmeter including a conduit with a dually looped midsection, wherein the two halves of the conduit are vibrated relative to one another in directions generally parallel to a plane including the dually looped midsection of the conduit.

FIG. 4 illustrates an embodiment of the mass flowmeter comprising a conduit with a curved midsection disposed on a plane generally parallel to a line connecting the inlet and outlet sections of the conduit, wherein the two halves of the conduit are vibrated relative to one another in directions generally parallel to the plane including the curved midsection and generally perpendicular to the line connecting the inlet and outlet sections of the conduit.

FIG. 5 illustrates an embodiment of the mass flowmeter comprising a conduit with a curved midsection disposed on a plane generally perpendicular to a line connecting the inlet and outlet sections of the conduit, wherein the two halves of the conduit are vibrated relative to one another in directions generally parallel to the plane including the curved midsection of the conduit.

DESCRIPTION OF THE ILLUSTRATED EMBODIMENTS

Figure 7:
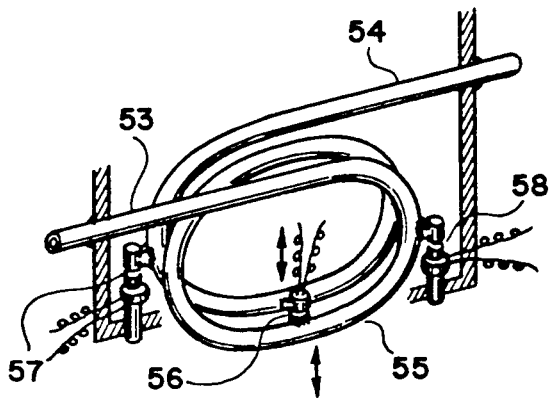
FIG. 7 illustrates an embodiment of the mass flowmeter comprising a double loop midsection, wherein the two halves of the conduit are vibrated relative to one another in directions generally parallel to a plane including the double loop midsection of the conduit.
Figure 8:
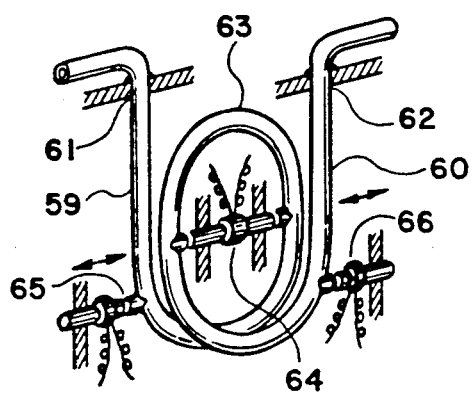
FIG. 8 illustrates an embodiment of the mass flowmeter comprising a conduit with an over-hanging looped midsection, wherein the two halves of the conduit are vibrated relative to one another in directions generally parallel to a plane including the over-hanging looped midsection of the conduit.
Figure 9:
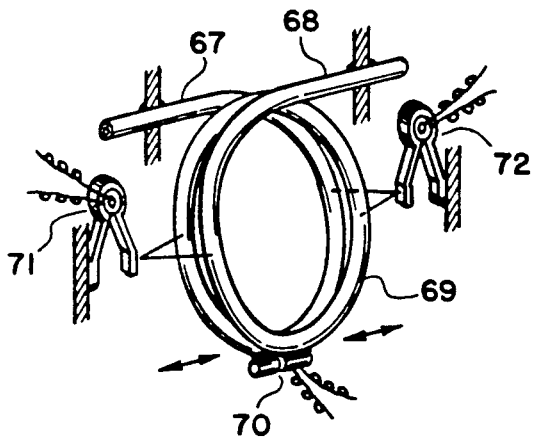
FIG. 9 illustrates an embodiment of the mass flowmeter comprising a conduit with an over-hanging double loop midsection, wherein the two halves of the conduit are vibrated relative to one another in directions generally parallel to a plane including the over-hanging double loop midsection of the conduit.

In FIG. 1 there is illustrated an embodiment of the mass flowmeter constructed in accordance with the principles of the present invention. The conduit employed in the construction of the mass flowmeter comprises two end sections 1 and 2 extending towards one another respectively from the two secured extremities 3 and 4 of the conduit in a parallel and spaced relationship therebetween, which two end sections are connected to one another by a looped midsection 5 of the conduit. An electromagnetic vibrator 6 including an electromagnet 7 affixed to one end section 1 of the conduit and a ferromagnetic member 8 affixed to the other end section 2 of the conduit vibrates the two opposite halves of the conduit relative to one another preferably at the natural frequency of the vibration in directions generally parallel to a plane including the looped midsection 5 of the conduit and generally perpendicular to a line connecting the two fixed extremities 3 and 4 of the conduit to one another. A pair of motion sensors 9 and 10 of the magnetic induction coil type measure relative vibrations between a first half of the looped midsection 5 of the conduit and a root section of the first end section 1 of the conduit, and between a second half of the looped midsection 5 of the conduit and a root section of the second end section 2 of the conduit, respectively. The pair of motion sensors 9 and 10 may be replaced by a pair of motion sensors 11 and 12 of the Piezo electric type respectively measuring the flexural vibrations of the two opposite halves of the looped midsection 5 of the conduit. Each of the two Piezo electric motion sensors 11 and 12 comprises a circular cylindrical shell Piezo electric element retained in a circular cylindrical cavity with an open circumferential wall in a squeezed relationship, wherein the degree of squeezing is varied by the relative motion between two elongated members respectively extending from two halves of the circuferential wall of the circular cylindrical cavity and coupled to the two elements under relative vibration therebetween. As a replacement of or in addition to the pair of motion sensors 9 and 10 or 11 and 12, a motion sensor or accelerometer 13 may be included at the midsection 14 of the conduit. It should be mentioned that the looped midsection 5 of the conduit may include a full loop as shown in the particular illustrated embodiment, or a partial loop as shown in FIGS. 4 and 5, or double loop as shown in FIGS. 7, 8 and 9. The vibrator power supply 15 energizes the electromagnetic vibrator 6 with an alternating current of frequency preferably equal to the natural frequency of the relative flexural vibration of the two halves of the conduit. The comparative vibration analyzer 16 detects difference between the two flexural vibrations respectively measured by the two motion sensors 9 and 10, or 11 and 12, or measures the amplitude of vibration detected by the motion sensor 13, which vibration analyzer may also feed back information on the natural frequency of the flexural vibration to the vibrator power supply 15.

In FIG. 2 there is illustrated the distribution of the fluid dynamic reaction to the vibrating conduit exerted by the media moving through the conduit, which is given by equation $$F_R = -A\rho U \frac{\partial v}{\partial s}. \qquad (1)$$

where $F_R$ is the fluid dynamic reaction, A is the cross section area of the flow passage provided by the conduit, $\rho$ is the density of fluid moving through the conduit, U is the velocity of fluid, v is the lateral component velocity of the flexural vibration perpendicular to the central axis of the conduit, and s is distance measured along the central axis of the conduit. It is evident from the structural arrangement shown in FIG. 1 that the lateral component velocity v of the flexural vibration has a distribution that is antisymmetric about the midsection 14 of the conduit, wherein v vanishes at the midsection 14 and two other sections of the looped midsection 5 whereat the tangential line of the conduit is parallel to the directions of flexural vibration. The fluid dynamic reaction to the flexural vibration of the conduit, that is proportional to gradient of the flexural vibration $\partial v/\partial s$, has a distribution that is symmetric about the midsection 14 of the conduit and vanishes at four different sections of the conduit as shown in FIG. 2. The electromagnetic vibrator 6 generates a primary flexural vibration of the conduit that has an antisymmetric distribution about the midsection 14 of the conduit, which primary flexural vibration creates a fluid dynamic reaction of symmetric distribution that generates a secondary flexural vibration having a symmetric distribution about the midsection 14 of the conduit.

The mass flowmeter of the present invention determines the mass flow rate of media moving through the vibrating conduit from the amplitude of the secondary flexural vibration, as the latter is proportional to the former. The amplitude of the secondary flexural vibration can be directly measured by a motion sensor 13 disposed at the midsection 14 of the conduit whereat the primary flexural vibration vanishes. The amplitude of the secondary flexural vibration can also be determined from the phase angle difference in the flexural vibration between the two opposite halves of the conduit and, consequently, the mass flow rate can be determined from the phase angle difference between the two vibratory motions respectively measured by the two motion sensors 9 and 10 or 11 and 12. It should be understood that the high sensity provided by the mass flowmeter of the present invention results from the high vibration velocity gradient $\partial v/\partial s$, as the distribution of the vibration velocity v must have steep peaks and valleys between three different nodal sections in the vibration of the fluid medium, which are distributed following the length of the conduit.

In FIG. 3 there is illustrated an embodiment of the mass flowmeter comprising a conduit including two end sections 17 and 18 extending towards one another in a parallel and spaced relationship therebetween respectively from two secured extremities of the conduit, which two end sections 17 and 18 are connected to one another by a curved midsection 19 including a first loop 20 turning in the first direction and disposed on one side of the combination of the two end sections 17 and 18, and a second loop 21 turning in the second direction opposite to the first direction and disposed on the other side of the combination of the two end sections 17 and 18 opposite to the first side thereof. The electromagnetic vibrator 22 vibrates the two opposite halves of the conduit relative to one another in directions generally parallel to a plane including the curved midsection 19 of the conduit and generally perpendicular to the two end sections 17 and 18 of the conduit. The mass flow rate of media moving through the conduit is determined from the phase angle difference between the flexural vibrations of the two halves of the conduit respectively measured by the pair of motion sensors 23 and 24, or from the amplitude of the secondary flexural vibration measured by a motion sensor disposed at the midsection of the conduit, which motion sensor is not shown in the particular illustrated embodiment for the brevity of the illustration. It should be mentioned that the midsection of the vibrating conduit employed in various illustrative embodiments shown in FIGS. 1, 3, 4, 5, 6, 7, 8, 9, 10 and 11 may be left unsupported or may be simply secured to a support when a motion detector is not disposed thereat.

In FIG. 4 there is illustrated an embodiment of the mass flowmeter comprising a conduit having two end sections 25 and 26 respectively extending from the two secured extremities 27 and 28 of the conduit towards one another in a coaxial arrangement, which two end sections 25 and 26 are connected to one another by a curved midsection 29 of an open loop construction disposed on a plane that includes the common central axis of the two end sections 25 and 26 of the conduit. An electromagnetic vibrator 30 vibrates the two opposite halves of the conduit relative to one another in directions generally parallel to a plane including the curved midsection 29 of the conduit and generally perpendicular to the common central axis of the two end sections 25 and 26 of the conduit. The flexural vibrations of the two opposite halves of the conduit are respectively measured by two motion sensors 31 and 32 or by another pair of motion sensors 33 and 34. The mass flow rate of media moving through the conduit is determined from phase angle difference between two vibratory motions respectively measured by the two motion sensors 31 and 32, or 33 and 34. Of course, the mass flow rate can also be determined from the amplitude of the flexural vibration measured by a motion sensor disposed at the midsection of the conduit, which motion sensor is not shown in the particular illustrated embodiment.

In FIG. 5 there is illustrated an embodiment of the mass flowmeter comprising a conduit having two ends sections 35 and 36 extending towards one another in a parallel relationship therebetween respectively from the two fixed extremities 37 and 38 of the conduit, which two end sections are connected to one another by a curved midsection 39 of a looped construction disposed on a plane generally perpendicular to the two end sections 35 and 36 of the conduit. An electromagnetic vibrator 40 vibrates the two opposite halves of the conduit relative to one another in directions generally to a plane including the curved midsection 39 of the conduit. The flexural vibrations of the two opposite halves of the conduit are respectively measured by the pair of motion sensors 41 and 42 or the pair of motion sensors 43 and 44. The embodiment of the mass flowmeter shown in FIG. 5 operates on the same principles as those described in conjunction with FIGS. 1 through 4.

Figure 6:
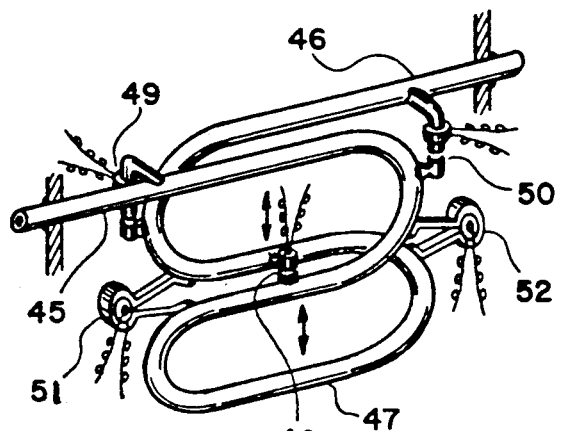
FIG. 6 illustrates an embodiment of the mass flowmeter comprising a conduit with a "figure eight shaped" midsection, wherein the two halves of the conduit are vibrated relative to one another in directions generally parallel to a plane including the curved midsection of the conduit.

In FIG. 6 there is illustrated an embodiment of the mass flowmeter comprising a conduit including two end sections 45 and 46 extending towards one another in a parallel and spaced relationship respectively from the two fixed extremities of the conduit, which two end sections are connected to one another by a curved midsection 47 having a "figure eight" shape. The electromagnetic vibrator 48 vibrates the two opposite halves of the conduit relative to one another in directions generally parallel to a plane including the curved midsection 47 of the conduit and generally perpendicular to the two end sections 45 and 46 of the conduit. The flexural vibrations of the two opposite halves of the conduit are respectively measured by the two motion sensors 49 and 50 or by the two motion sensors 51 and 52. This embodiment of the mass flowmeter operates on the same principles as those previously described.

In FIG. 7 there is illustrated an embodiment of the mass flowmeter comprising a conduit including two end sections 53 and 54 extending towards one another respectively from the two fixed extremities in a parallel and spaced relationship, which two end sections are connected to one another by a double loop midsection 55 of the conduit. The electromagnetic vibrator 56 vibrates the two opposite halves of the conduit relative to one another in directions generally parallel to a plane including the double loop midsection 55 of the conduit and generally perpendicular to the two end sections 53 and 54. The flexural vibrations of the two opposite halves of the conduit are respectively measured by two motion sensors 57 and 58. This mass flowmeter operates on the same principles as those previously described.

In FIG. 8 there is illustrated an embodiment of the mass flowmeter comprising a conduit having two end sections 59 and 60 respectively extending from two fixed extremities of the conduit 61 and 62 towards a generally common direction, which two end sections are connected to one another by a looped midsection 63. The electromagnetic vibrator 64 vibrates the two opposite halves of the looped midsection 63 of the conduit relative to one another in directions generally parallel to a plane including the looped midsection 63 and generally perpendicular to the two end sections 59 and 60. The flexural vibrations of the two opposite halves of the conduit are respectively measured by two motion sensors 65 and 66. This mass flowmeter operates on the same principles as those previously described.

In FIG. 9 there is illustrated an embodiment of the mass flowmeter comprising a conduit including two end sections 67 and 68 extending towards one another in a generally parallel and spaced relationship respectively from two fixed extremities of the conduit, which two end sections are connected to one another by a double loop midsection 69 of the conduit. The electromagnetic vibrator 70 vibrates the two opposite halves of the conduit relative to one another in directions generally parallel to a plane including the double loop midsection 70 and generally parallel to a line connecting the two fixed extremities of the conduit. The flexural vibrations of the two opposite halves of the conduit are respectively measured by two motion sensors 71 and 72, which may be coupled to either of the two loops included in the double loop midsection 69 in an axisymmetric arrangement about an axis passing through the midsection of the conduit and the electromagnetic vibrator. This mass flowmeter operates on the same principles as those previously described. It should be mentioned that each of the pair of motion detectors employed in the embodiments shown in FIGS. 7, 8 and 9 may be replaced by a pair of relative motion detectors measuring the relative vibratory motion between two adjacent legs of the conduit at sections where the motion detectors are disposed in the particular illustrative embodiments.

Figure 10:
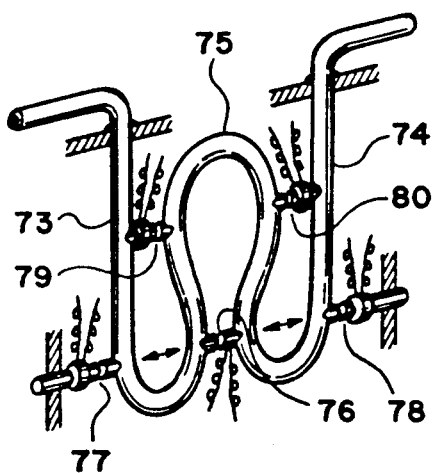
FIG. 10 illustrates an embodiment of the mass flowmeter comprising a conduit with an over-hanging curved midsection disposed on a plane including the inlet and outlet sections of the conduit, wherein the two halves of the conduit are vibrated relative to one another on the plane including the over-hanging curved midsection of the conduit.

In FIG. 10 there is illustrated an embodiment of the mass flowmeter including a conduit having two end sections 73 and 74 respectively extending from the two fixed extremities of the conduit towards a common direction, which two end sections are connected to one another by an "Omega" shaped curved midsection 75 of the conduit. The electromagnetic vibrator 76 vibrates the two opposite halves of the conduit relative to one another in directions generally parallel to a plane including the conduit and generally parallel to a line connecting the two fixed extremities of the conduit. The flexural vibrations of the two opposite halves of the conduit are respectively measured by the two motion detectors 77 and 78 or by the two motion detectors 79 and 80. This mass flowmeter operates on the same principles as those previously described.

Figure 11:
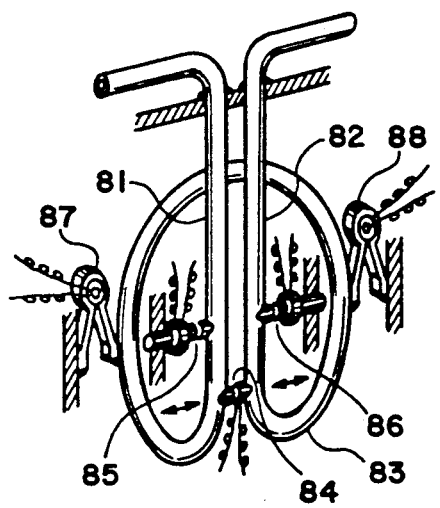
FIG. 11 illustrates an embodiment of the mass flowmeter comprising a conduit with an over-hanging curved midsection disposed on a plane off set from and parallel to a plane including the inlet and outlet sections of the conduit, wherein the two halves of the conduit are vibrated relative to one another in directions generally parallel to the plane including the over-hanging curved midsection of the conduit.

In FIG. 11 there is illustrates an embodiment of the mass flowmeter comprising a conduit including two end sections 81 and 82 respectively extending from two fixed extremities of the conduit towards a generally common direction, which two end sections are connected to one another by a curved midsection 83 of a looped construction disposed on a plane parallel to and offset from the plane including the two end sections 81 and 82. The electromagnetic vibrator 84 vibrates the two opposite halves of the conduit relative to one another in directions generally parallel to a plane including the curved midsection 83 and generally parallel to a line connecting the two fixed extremities of the conduit. The flexural vibrations of the two opposite halves of the conduit are respectively measured by the two motion detectors 85 and 86 or by the two motion detectors 87 and 88. This mass flowmeter operates on the same principles as those previously described.

Figure 12:
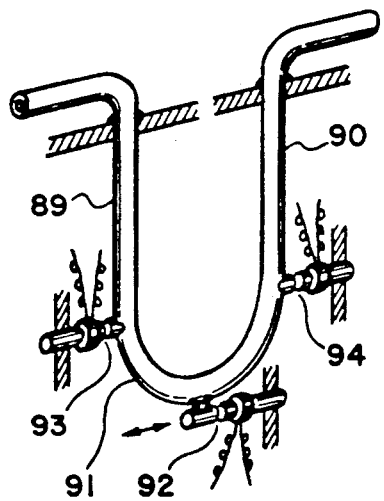
FIG. 12 illustrates an embodiment of the mass flowmeter comprising a conduit with an over-hanging curved midsection, wherein the over-hanging curved midsection is vibrated in directions parallel to a plane including the over-hanging curved midsection of the conduit.

In FIG. 12 there is illustrated an embodiment of the mass flowmeter comprising a conduit including two end sections 89 and 90 respectively extending from the two fixed extremities of the conduit towards a generally common direction, which two end sections are connected to one another by a curved midsection 91. The electromagnetic vibrator 92 exerts a vibratory force to the midsection of the conduit, that creates a flexural vibration of the conduit in directions generally parallel to a line connecting the two fixed extremities of the conduit. The flexural vibrations of the two opposite halves of the conduit are respectively measured by two motion detectors 93 and 94. The mass flow rate of media moving through the conduit is determined from the phase angle difference between two vibratory motions respectively measured by the two motion sensors 93 and 94. It should be mentioned that a pair of conduits having the same construction as that shown in FIG. 12 may be disposed in a parallel and side-by-side arrangement and connected to a common inlet and outlet, wherein the electromagnetic vibrator disposed at the midsection of the combination of the two conduits vibrates the two conduits relative to one another in directions generally parallel to a line connecting the two fixed extremities of one of the two conduits. Two motion detectors measure the relative flexural vibrations between the two conduits at two locations disposed symmetrically about the midsection of the combination of the two conduits.

Figure 13:
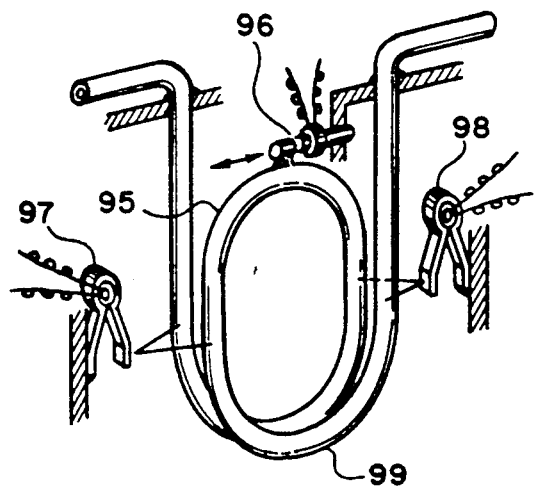
FIG. 13 illustrates an embodiment of the mass flowmeter comprising a conduit with a looped midsection, wherein the looped midsection is vibrated in directions generally parallel to a plane including the looped midsection of the conduit.

In FIG. 13 there is illustrated an embodiment of the mass flowmeter comprising a conduit including a looped midsection 95 that is vibrated by an electromagnetic vibrator 96 disposed at the midsection of the conduit in directions generally parallel to a plane including the looped midsection and generally parallel to a line connecting the two fixed extremities of the conduit. The flexural vibrations of the two opposite halves of the conduit are respectively measured by two motion sensors 97 and 98 disposed symmetrically about the midsection of the conduit. As an alternative design of the embodiment shown in FIG. 13, the electromagnetic vibrator 96 may be relocated to a new position 99 diametrically opposite from the existing position, wherein the electromagnetic vibrator vibrates the two opposite halves of the conduit relative to one another in directions parallel to a line connecting the two fixed extremities of the conduit. The pair of motion detectors 97 and 98 may be replaced by another pair of motion detectors, each of which measures relative flexural vibration between two adjacent legs of the conduit at one of the two locations disposed symmetrically about the midsection of the conduit. The mass flowmeter shown in FIG. 13 or a modified version thereof described in the preceding paragraphs determines the mass flow rate from the phase angle difference between two flexural vibrations respectively measured by the two motion detectors located symmetrically about the midsection of the conduit.

Figure 14:
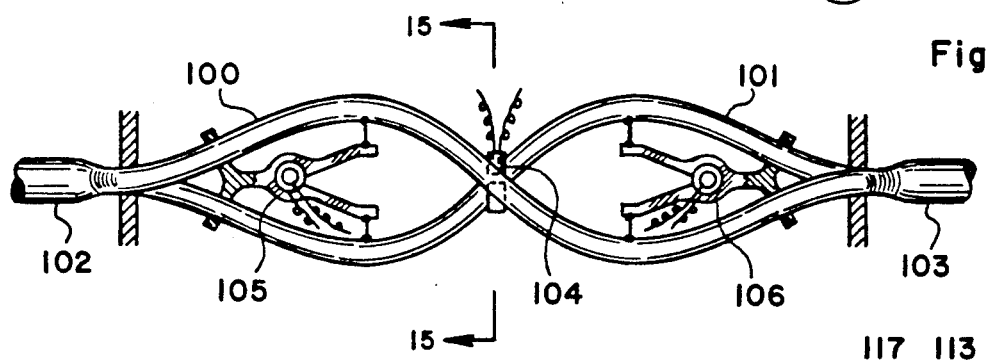
FIG. 14 illustrates an embodiment of the mass flowmeter comprising a pair of conduits respectively disposed on two parallel planes, each of which includes two curved halves disposed on a plane in an axisymmetric arrangement about an axis perpendicular to the plane including the conduit and passing through the midsection of the conduit, wherein the two conduits are vibrated relative to one another in directions generally parallel to the plane including the conduit.

In FIG. 14 there is illustrated an embodiment of the mass flowmeter comprising a pair of S-shaped conduits 100 and 101 disposed in an axisymmetric arrangement about an axis coinciding with the central axes of the common inlet and outlet legs 102 and 103 of the flowmeter, to which the pair of S-shaped conduits are connected in a parallel arrangement. The electromagnetic vibrator 104 disposed intermediate the two S-shaped conduits at the midsection of the combination thereof vibrates the two S-shaped conduits 100 and 101 relative to one another in directions generally parallel to a plane including one of the two S-shaped conduit and generally perpendicular to the common central axis of the inlet and outlet legs 102 and 103. The pair of relative motionsensors 105 and 106 measure the relative flexural vibrations between the two S-shaped conduits 100 and 101 respectively at two locations disposed symmetrically about the midsection of the combination of the two S-shaped conduits. The mass flow rate of media moving through the two S-shaped conduits 100 and 101 is determined from the phase angle difference between the two relative vibratory motions respectively measured by the two motion sensors 105 and 106.

Figure 15:
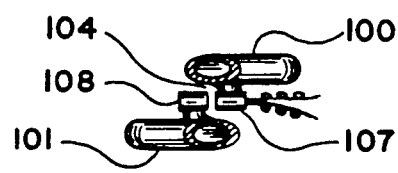
FIG. 15 illustrates a cross section of the pair of conduits shown in FIG. 14.

In FIG. 15 there is illustrated a cross section of the embodiment shown in FIG. 14, which cross section taken along plane 15—15 as shown in FIG. 14 shows the electromagnetic vibrator 104 including an electromagnet 107 affixed to the first S-shaped conduit 100 and a ferromagnetic element 108 affixed to the second S-shaped conduit 101.

Figure 16:
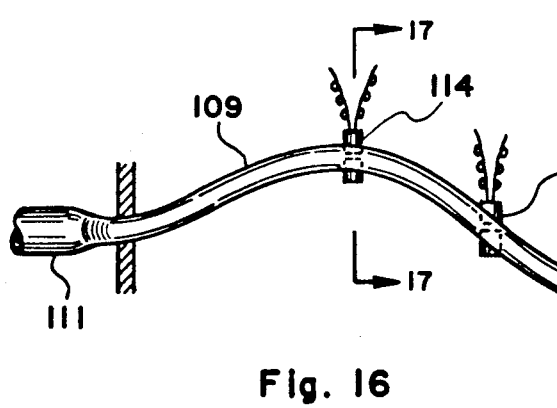
FIG. 16 illustrates an embodiment of the mass flowmeter comprising two parallel conduits, each of which includes two curved halves disposed on a plane in an axisymmetric arrangement about an axis perpendicular to the plane including the conduit and passing through the midsection of the conduit, wherein the two conduits are vibrated relative to one another in directions generally parallel to the plane including the conduit.

In FIG. 16 there is illustrated another embodiment of the mass flowmeter comprising a pair of S-shaped conduits 109 and 110 respectively disposed on two parallel planes in a side-by-side arrangement and connected to a common inlet and outlet legs 111 and 112 of the flowmeter. The electromagnetic vibrator 113 disposed intermediate the two S-shaped conduits at the midsection of the combination thereof vibrates the two S-shaped conduits 109 and 110 relative to one another in directions generally parallel to a plane including one of the two S-shaped conduits and generally perpendicular to the common central axis of the inlet and outlet legs 111 and 112. The two relative motion sensors 114 and 115 measure relative vibrations between the two S-shaped conduits respectively at two locations disposed symmetrically about the midsection of the combination of the two S-shaped conduits 109 and 110. This embodiment of the mass flowmeter operates on the same principles as those described in conjunction with FIG. 14.

Figure 17:
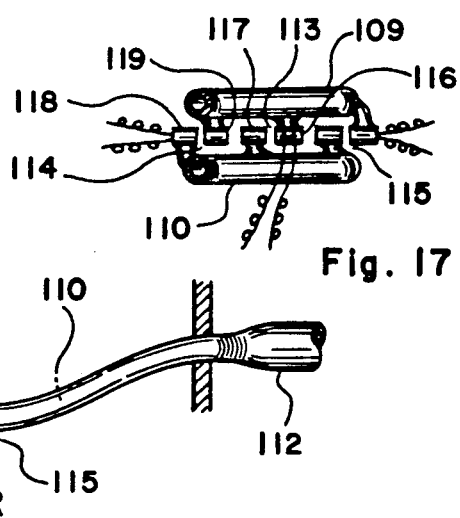
FIG. 17 illustrates a cross section of the pair of conduits shown in FIG. 16.

In FIG. 17 there is illustrated a cross section of the embodiment shown in FIG. 16, which cross section taken along plane 17—17 as shown in FIG. 16 shows the electromagnetic vibrator 113 including an electromagnet 116 affixed to the first S-shaped conduit 109 and a ferromagnetic element 117 affixed to the second S-shaped conduit 110 as well as the two relative motion sensors 114 and 115, each of which includes a magnetic induction coil 118 affixed to one of the two S-shaped conduits and a permanent magnet or ferromagnetic element 119 affixed to the other of the two S-shaped conduits. It is evident that one of the two S-shaped conduits can be eliminated from the embodiment shown in FIGS. 14 or 16 and the relative motion sensors can be replaced by an ordinary motion sensors in constructing a mass flowmeter comprising a single S-shaped conduit.

While the principles of the present inventions have now been made clear by the illustrative embodiments, there will be many modifications of the structures, arrangements, proportions, elements and materials obvious to those skilled in the art, which are particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for measuring mass flow rate of media comprising in combination:
   (a) a conduit with two extremities secured to a support, said conduit including two end sections respectively extending from the two secured extremities of the conduit and connected to one another by a curved midsection of the conduit;
   (b) means for vibrating a first half of the conduit including one of said two end sections of the conduit and a first half of the curved midsection of the conduit, and a second half of the conduit including the other of said two end sections of the conduit and a second half of the curved midsection of the conduit relative to one another in directions generally parallel to a plane including the curved midsection of the conduit; and
   (c) means for detecting difference in flexural vibration between said first and second halves of the conduit as a measure of mass flow rate of media moving through the conduit.

2. The combination as set forth in claim 1 wherein said means for detecting difference in flexural vibration comprises two motion sensors respectively measuring flexural vibrations of said first and second halves of the conduit.

3. The combination as set forth in claim 2 wherein the mass flow rate of media is determined from phase angle difference between two flexural vibrations respectively measured by said two motion sensors.

4. The combination as set forth in claim 1 wherein said means for detecting difference in flexural vibration comprises a motion detector measuring flexural vibration of the conduit at a midsection of the conduit, whereat the flexural vibration vanishes when the media contained in the conduit is stationary.

5. The combination as set forth in claim 4 wherein the mass flow rate of media is determined from the amplitude of the flexural vibration of the conduit measured by said a motion detector measuring flexural vibration of the conduit at said a midsection of the conduit.

6. The combination as set forth in claim 1 wherein said first and second halves of the conduit are vibrated relative to one another in directions generally perpendicular to a line connecting the two secured extremities of the conduit.

7. The combination as set forth in claim 6 wherein said curved midsection of the conduit comprises at least one complete loop of the conduit.

8. The combination as set forth in claim 6 wherein said curved midsection of the conduit comprises less than one complete loop of the conduit.

9. The combination as set forth in claim 1 wherein said first and second halves of the conduit are vibrated relative to one another in directions generally parallel to a line connecting the two secured extremities of the conduit.

10. The combination as set forth in claim 9 wherein said curved midsection of the conduit comprises at least one complete loop of the conduit.

11. The combination as set forth in claim 9 wherein said curved medsection of the conduit comprises less than one complete loop of the conduit.

12. An apparatus for measuring mass flow rate of media comprising in combination:
    (a) a conduit with two extremities secured to a support, said conduit including two end sections respectively extending from the two secured extremities of the conduit in a lateral relationship to a line connecting the two secured extremities of the conduit and connected to one another by a curved midsection of the conduit said curved midsection substantially lying in a plane including said two end section
    (b) means for vibrating a first half of the conduit including one of said two end sections of the conduit and a first half of the curved midsection of the conduit, and a second half of the conduit including the other of said two end sections of the conduit and a second half of the curved midsection of the conduit relative to one another in directions generally parallel to the plane including the curved midsection of the conduit; and
    (c) means for detecting difference in flexural vibration between said first and second halves of the conduit as a measure of mass flow rate of media moving through the conduit.

13. The combination as set forth in claim 12 wherein said means for detecting difference in flexural vibration comprises two motion sensors respectively measuring flexural vibrations of said first and second halves of the conduit.

14. The combination as set forth in claim 13 wherein the mass flow rate of the media is determined from the phase angle difference between two flexural vibrations respectively measured by said two motion sensors.

15. The combination as set forth in claim 12 wherein said curved midsection of the conduit comprises at least one complete loop of the conduit.

16. The combination as set forth in claim 12 wherein said curved midsection of the conduit comprises less than one complete loop of the conduit.

* * * * *